(12) United States Patent
Leighton et al.

(10) Patent No.: US 10,746,991 B2
(45) Date of Patent: Aug. 18, 2020

(54) OPTICAL WAVEGUIDE FOR HEAD UP DISPLAY, AND MANUFACTURING METHOD THEREFOR

(71) Applicant: BAE SYSTEMS plc, London (GB)

(72) Inventors: James Raymond Leighton, Rochester (GB); Rory Thomas Alexander Mills, Rochester (GB); Michael David Simmonds, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/302,000

(22) PCT Filed: Apr. 10, 2017

(86) PCT No.: PCT/GB2017/050992
§ 371 (c)(1),
(2) Date: Nov. 15, 2018

(87) PCT Pub. No.: WO2017/203200
PCT Pub. Date: Nov. 30, 2017

(65) Prior Publication Data
US 2019/0162962 A1    May 30, 2019

(30) Foreign Application Priority Data
May 23, 2016   (GB) .................................. 1609026.8

(51) Int. Cl.
*G02B 27/01*   (2006.01)
*F21V 8/00*    (2006.01)
*G02B 27/00*   (2006.01)

(52) U.S. Cl.
CPC ....... *G02B 27/0101* (2013.01); *G02B 6/0025* (2013.01); *G02B 6/0036* (2013.01);
(Continued)

(58) Field of Classification Search
CPC .............. G02B 27/0101; G02B 6/0025; G02B 6/0036; G02B 6/0055; G02B 6/0065;
(Continued)

(56) References Cited

U.S. PATENT DOCUMENTS 6,039,553 A   3/2000 Lundin et al.
9,081,178 B2  7/2015 Simmonds et al.
(Continued)

FOREIGN PATENT DOCUMENTS

CN   104656259 A   5/2015
CN   105549150 A   5/2016
(Continued)

OTHER PUBLICATIONS

International Preliminary Report on Patentability received for PCT Application No. PCT/GB2017/050992. dated Dec. 6, 2018. 8 pages.
(Continued)

*Primary Examiner* — John Bedtelyon
(74) *Attorney, Agent, or Firm* — Finch & Maloney PLLC

(57) ABSTRACT

A waveguide structure for a head up display in which a reflective output coupling structure is formed of a separate, but connected, component to a main waveguide. In a method of manufacture for such a waveguide the output coupling structure may be formed by depositing a material on a main waveguide, impressing the reflective structure into that material, and curing the material.

19 Claims, 3 Drawing Sheets

(52) U.S. Cl.
CPC ........ *G02B 6/0055* (2013.01); *G02B 6/0065* (2013.01); *G02B 27/0189* (2013.01); *G02B 27/0081* (2013.01); *G02B 2027/011* (2013.01)

(58) Field of Classification Search
CPC .......... G02B 27/0081; G02B 2027/011; G02B 27/0189; G02B 27/017; G02B 27/0172
See application file for complete search history.

(56) References Cited

U.S. PATENT DOCUMENTS 9,291,822 B2 * 3/2016 Totani ................ G02B 27/0172
10,030,846 B2 * 7/2018 Vasylyev ............. G02B 6/0031

FOREIGN PATENT DOCUMENTS

| EP | 1135648 A1 | 9/2001 |
|----|------------|--------|
| EP | 1496378 A1 | 1/2005 |
| GB | 2514658 A | 12/2014 |
| JP | S6097309 A | 5/1985 |
| WO | 2015/091277 A1 | 6/2015 |
| WO | 2017/203200 A1 | 11/2017 |

OTHER PUBLICATIONS

International Search Report and Written Opinion received for PCT Application No. PCT/GB2017/050992. dated Jun. 30, 2017. 12 pages.
Search Report under Section 17(5) received for GB Application No. GB 1609026.8, dated Nov. 29, 2016. 4 pages.

* cited by examiner (a)

(b)

(c)

(d)

OPTICAL WAVEGUIDE FOR HEAD UP DISPLAY, AND MANUFACTURING METHOD THEREFOR

This disclosure relates to manufacturing techniques for optical waveguides and is particularly, but not exclusively, relevant to the manufacture of waveguides for head up displays.

Head up displays utilise a transparent component, which the user looks through, to overlay an image on the user's actual view of the surroundings. The user's eye receives light from those surroundings in the normal way, and the user's eye also receives light from the head up display system and can thus view both images at once.

The transparent component of a head up display may be either mounted in a fixed position on equipment being used by a user (for example the cockpit of an aircraft), or on the head of the user (for example as a pair of spectacles, or on a helmet) such that the component moves with the user's head and thus remains at a fixed location in relation to the user's eye.

A fundamental requirement of a head up display is to couple light from an image source to the location required for viewing by the user. This is typically accomplished utilised a waveguide system as shown in cross section in FIG. 1.

Waveguide 10 is formed from an optically transmissive material which propagates light at the required wavelengths. Image light (shown as an example ray, 13) from a projector (mounted, for example in the cockpit or helmet, out of the line-of-sight of the user) is injected into a first end 11 of the waveguide using a coupling device 12, for example a prism. Ray 13 then propagates along the length of the waveguide, guided by total internal reflection at the surfaces of the waveguide. The waveguide surfaces may be plain or may be coated to improve performance. At the required location an output coupling structure 14 is provided to redirect the light out of the waveguide 10 towards the user's eye 15. FIG. 1 is not drawn to scale and the output coupling structure is shown greatly enlarged to demonstrate its presence and general structure. Reflective coupling structures as shown are typically at a scale of microns. As shown by ray 16, light from the outside world propagates through the waveguide to the user's eye.

The structure of FIG. 1 thus allows the transmission of an image from a projector to a user's eye, without placing any non-transparent components in the user's field of view.

The image presented to the user will be distorted by irregularities (for example non-flat surfaces or non-parallel faces) in the optical waveguide 10 or any other element in the optical chain. As can be seen in FIG. 1 the output coupling structure 14 is formed in the surface of the waveguide, typically by stamping or engraving into the surface. Forming the output structure may induce stress and/or irregularities in the waveguide leading to poor optical performance. Such difficulties may increase the cost and time for manufacture.

There is therefore a requirement for a waveguide system to provide an improved image quality.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical waveguide for a head up display, the waveguide comprising a waveguide body extending from an input end to an output end, an input coupling device at the input end of the waveguide body for coupling light into the waveguide body, which light propagates along the waveguide body towards the output end by total internal reflection, an output coupling structure on a face of the waveguide body at the output end, the coupling structure formed separately, but attached to, the waveguide body, wherein the output coupling structure is a reflective structure configured to direct light out of the optical waveguide by reflection.

There is also provided a method of manufacturing a waveguide for a head up display, the method comprising the steps of providing a waveguide body having an input end and an output end, depositing an optically transmissive material on a face of the waveguide in an output coupling region at the output end, impressing into the optically transmissive material a reflective structure, and curing the optically transmissive material to form an output coupling device.

The input coupling device may be a prism.

The output coupling structure may be a saw-tooth grating.

The output coupling structure may be a modified saw-tooth grating, graded along the propagation axis of the waveguide body to provide varying reflectivity. The grading may be by varying the size, depth, or spacing of features of the grating.

The optical waveguide may further comprise an optical coating between the waveguide body and the output coupling structure.

The optical waveguide may further comprise an optical coating on the exposed face of the output coupling structure.

The output coupling structure may be formed from a transmissive UV curing material.

The curing step may comprise exposing the transmissive material to UV light.

The optically transmissive material may be deposited in liquid or gel-like form.

The techniques disclosed herein attempt to improve the overall final product and also lower the overall manufacturing cost by increasing the yield of useable waveguides created from the process.

BRIEF DESCRIPTION OF THE DRAWINGS

Embodiments of the invention will be described, by way of example, with reference to the following drawings, in which.

DETAILED DESCRIPTION

Figure 1:
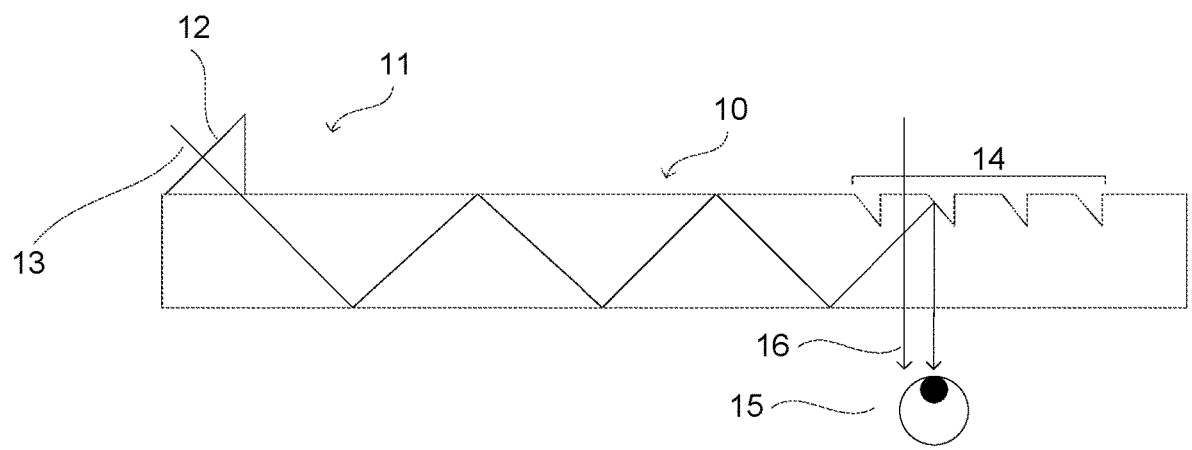
FIG. 1 shows a cross-section waveguide structure.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 2:
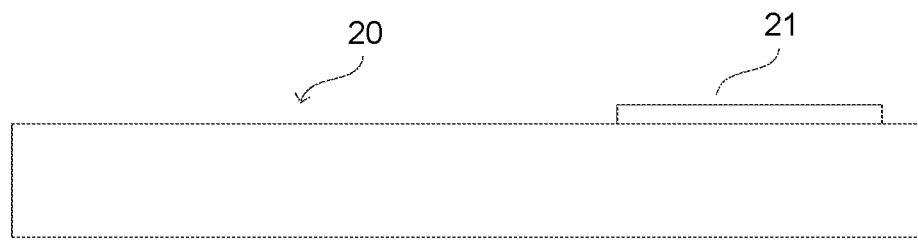
FIG. 2 shows a cross-section of a waveguide structure and manufacturing steps.
Figure 2:
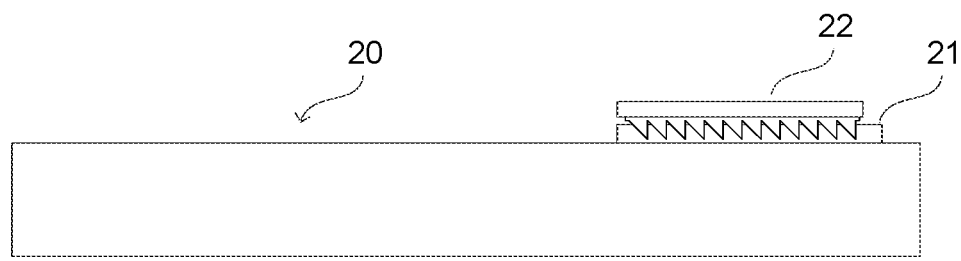
Figure 2:
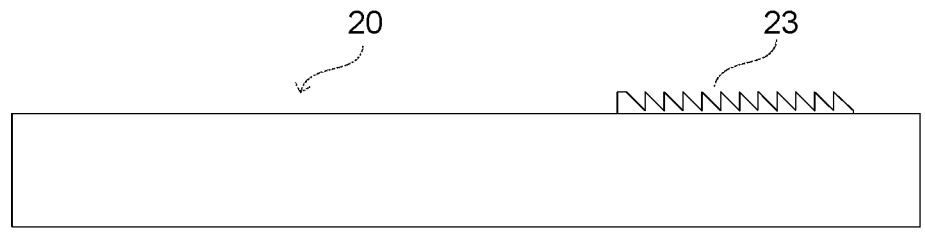
Figure 2:
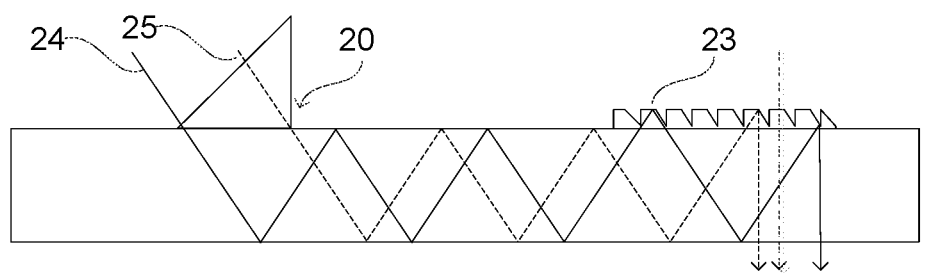
Figure 2:
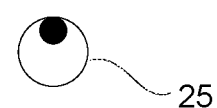
Figure 3:
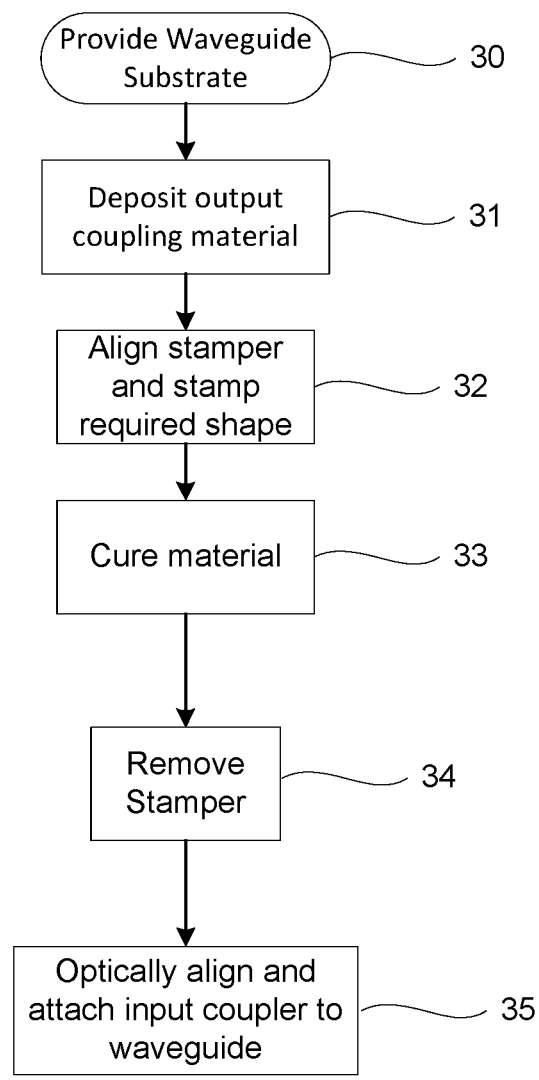
FIG. 3 shows a flow chart of a manufacturing process.

FIG. 2 shows a sequence of manufacturing steps to form a waveguide comparable to that shown in FIG. 1, and FIG. 3 shows a flow chart of the manufacturing technique.

In FIG. 2(a) (Step 30) an optical waveguide 20, equivalent to waveguide 10 without the input coupler 12 and prior to creation of the output coupling structure 14, is provided. The waveguide may be formed from any suitable glass or plastic material which is transmissive at the required operating wavelength. The waveguide is manufactured with optically flat, parallel, surfaces to provide light guidance with an acceptable level of distortion.

In the region in which the output coupling structure will be required a layer of optically transmissive material 21 is deposited (Step 31). That material may be a curable polymer or adhesive which remains liquid or gel-like until cured. Any material which performs as required by the process described below, and can be formed into the required output coupling structure, may be utilised. The refractive index of the material does not need to be matched to the refractive index of the waveguide 20, but any difference must be accounted for in the optical design to ensure correct optical performance.

In FIG. 2(b) a stamper tool 22 is brought into contact (Step 32) with the material 21 to impress into that material the output coupling structure. The stamper is formed of an appropriate material to impress the required shape into the material 21. The stamper may be the inverse of the final shape required, or may be modified to allow for changes in shape that are known to occur in the material 21 during stamping and curing.

As explained in relation to FIG. 1 the structure is not shown to scale and is much smaller, typically on a micron scale. The structure may be, for example, a microstructure comprising a spaced (flat-top) saw tooth grating structure or more complex structures may be utilised to give the required optical performance. The coupling structure is typically at a micron scale and is small enough that when presented close to a user's eye it does not interfere with normal vision through the device (i.e. with no, or acceptable levels of, visual distortion). The coupling structure may be graded along its length to grade the reflection out of the waveguide such that luminance is uniform across the exit pupil of the device. Grading may include grading the size, shape, and depth of the saw tooth features, or the separation between adjacent features. The saw-tooth grating may be flat-topped such that only a portion of the light interacting with the structure is reflected out of the device, with the remainder continuing to propagate via total internal reflection; for example a flat-topped saw tooth profile may be utilised.

The material 21 is then cured (Step 33) to set the material into the required structure. The curing may be performed as appropriate for the material being utilised. For example, a transmissive UV curing polymer or adhesive may be exposed to UV light to cure the material. The curing step may be performed while the stamper is in position, or if appropriate for the material being used, after the stamper has been removed.

As shown in FIG. 2(c) once the material has cured and the stamper removed (Step 34) the waveguide 20 has been provided with an output coupling structure 23 comparable to structure 14 shown in FIG. 1. The output coupling structure 23 is attached to the waveguide 20 by bonds formed during the curing process. The back surface of the output coupling structure 23 may be coated to improve the reflectivity of the structure and avoid the loss of light, and counter secondary reflections from external light sources.

FIG. 2(d) shows the device with the input prism added (Step 35) (a prism is shown by way of example only, any input coupler may be utilised for example diffractive elements may be used) and example rays 24 and 25 for reference. Rays 24 and 25 are indicative of image light propagating from a microdisplay projector. Rays 24 and 25 demonstrate the pupil replication effect of the flat-topped grating.

Ray 24, propagates through the waveguide structure in the same manner as explained with reference to FIG. 1, except that at the output coupling structure the light is transmitted into the structure 23. Total internal reflection does not occur at this interface due to the similarity of refractive indices between waveguide 20 and structure 23, but if there is a difference in refractive index there may be refraction at the interface. This refraction can be accommodated in the optical design.

Once the ray has entered the structure 23 it is reflected by the structure out of the guide to the user's eye 25. The waveguide of FIG. 2d thus provides the same function as the waveguide of FIG. 1, but the structure is formed with reduced mechanical processing of the waveguide 20 compared to the device of FIG. 1. The reduction in processing of the waveguide 20 reduces distortions and stresses in that device. This improves the image quality of a final device by reducing irregularities within the waveguide substrate (for example non-parallel or curved surface). Due to the reduced stresses yield is likely to increase, thus reducing manufacturing cost.

Forming the output coupling structure as a separate component may also allow other techniques to be utilised to improve the performance of the device. For example, an optical coating may be deposited on the top face of the waveguide 20 to control propagation of light into the output coupling structure 23. For example the coating may allow only a fraction of the light to propagate into the structure 23, and may reflect the remainder. This allows the light to be distributed across the output coupling structure 23, thus increasing the pupil size for a head up display. Complex multi-layer dielectric coatings may also be utilised to interact with the light in defined ways. For example the coating between the output structure 23 and waveguide 20 may be designed to be polarisation dependent.

Previously diffractive elements may have been required to provide the pupil expansion provided by the current device, but diffractive elements are challenging to produce and may limit the optical bandwidth of the device.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical waveguide for a head up display, the waveguide comprising:
   a waveguide body extending from an input end to an output end and configured to guide light by total internal reflection from the input end to the output end, the waveguide body having optically flat and parallel outward-facing surfaces;
   an input coupling device at the input end of the waveguide body for coupling light into the waveguide body; and
   an output coupling structure attached to one of the outward-facing surfaces outside of the waveguide body at the output end, the output coupling structure distinct from the waveguide body, wherein the output coupling structure includes a reflective structure configured to direct light out of the optical waveguide by reflection,
   wherein the output coupling structure includes a flat-topped saw-tooth grating to direct light out of the optical waveguide, the flat-topped saw-tooth grating having a flat top surface parallel to the outward-facing surfaces of the waveguide body.

2. The optical waveguide according to claim 1, wherein the input coupling device includes a prism or a diffractive grating.

3. The optical waveguide according to claim 1, wherein the saw-tooth grating is graded along a propagation axis of the waveguide body to provide varying reflectivity.

4. The optical waveguide according to claim 3, wherein the saw-tooth grating is graded by varying the size, depth, or spacing of features of the grating along the propagation axis.

5. The optical waveguide according to claim 1, further comprising an optical coating between the waveguide body and the output coupling structure.

6. The optical waveguide according to claim 1, further comprising an optical coating on an exposed face of the output coupling structure.

7. The optical waveguide according to claim 1, wherein the output coupling structure comprises a transmissive UV curing material.

8. A method of manufacturing a waveguide for a head up display, the method comprising:
   providing a waveguide body having an input end, an output end, and optically flat and parallel outward-facing surfaces;
   attaching an optically transmissive material to one of the outward-facing surfaces outside of the waveguide body at an output coupling region at the output end;
   impressing into the optically transmissive material a reflective structure; and
   curing the optically transmissive material to form an output coupling device.

9. The method according to claim 8, wherein the curing comprises exposing the transmissive material to UV light.

10. The method according to claim 8, wherein the optically transmissive material is attached in liquid or gel-like form.

11. The method according to claim 8, further comprising applying an optical coating between the waveguide body and the optically transmissive material.

12. The method according to claim 8, further comprising applying an optical coating to an exposed surface of the output coupling device.

13. The method according to claim 8, wherein the output coupling structure includes a flat-topped saw-tooth grating, the flat-topped saw-tooth grating having a flat top surface parallel to the outward-facing surfaces of the waveguide body.

14. The method according to claim 8, wherein the output coupling structure includes a saw-tooth grating, graded along a propagation axis of the waveguide body to provide varying reflectivity.

15. An optical waveguide for a head up display, the waveguide comprising:
   a waveguide body extending from an input end to an output end and configured to guide light by total internal reflection from the input end to the output end, the waveguide body having optically flat and parallel outward-facing surfaces;
   an input coupling device at the input end of the waveguide body for coupling light into the waveguide body; and
   an output coupling structure attached to one of the outward-facing surfaces outside of the waveguide body at the output end, the output coupling structure distinct from the waveguide body, wherein the output coupling structure includes a reflective structure configured to direct light out of the optical waveguide by reflection; and
   at least one of
      an optical coating between the waveguide body and the output coupling structure, and
      an optical coating on an exposed face of the output coupling structure.

16. The optical waveguide according to claim 15, wherein the output coupling structure includes a flat-topped saw-tooth grating configured to reflect light out of the optical waveguide, the flat-topped saw-tooth grating having a flat top surface parallel to the outward-facing surfaces of the waveguide body.

17. The optical waveguide according to claim 15, wherein the output coupling structure comprises a transmissive UV curing material.

18. The optical waveguide according to claim 16, wherein the saw-tooth grating is graded along a propagation axis of the waveguide body to provide varying reflectivity.

19. The optical waveguide according to claim 18, wherein the saw-tooth grating is graded by varying the size, depth, or spacing of features of the grating along the propagation axis.

* * * * *